Feb. 7, 1961 N. W. ADAMSKY 2,970,643
WINDOW SHADE
Filed Oct. 22, 1956 2 Sheets-Sheet 2
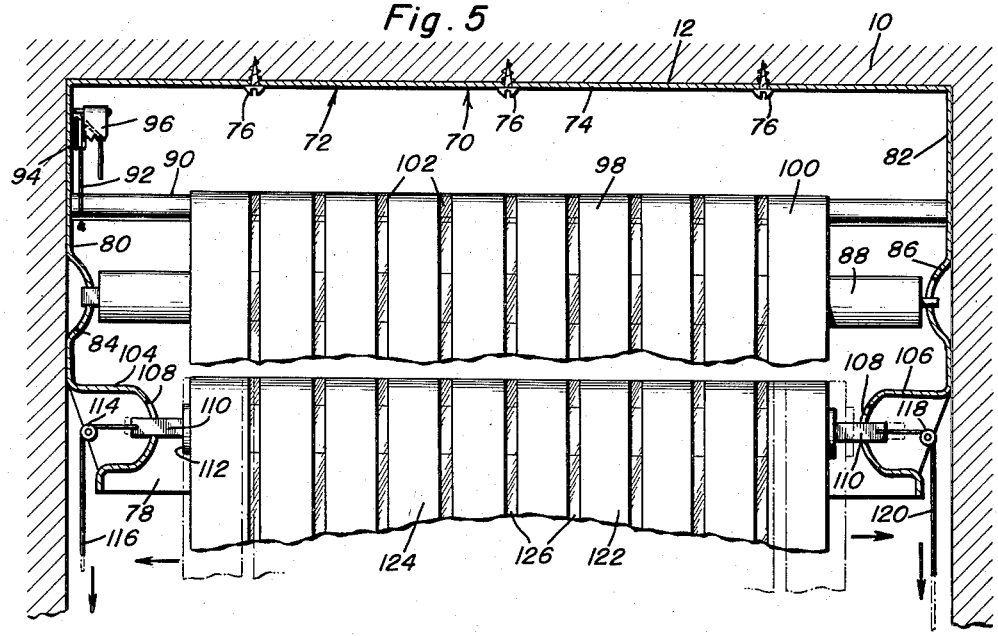
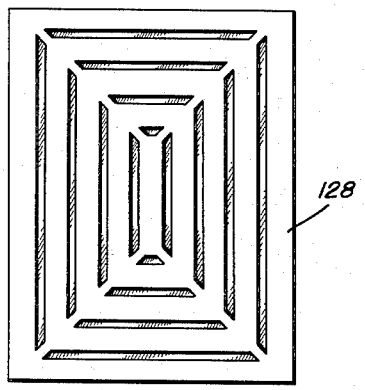
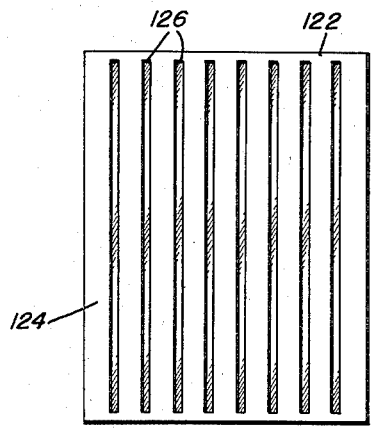
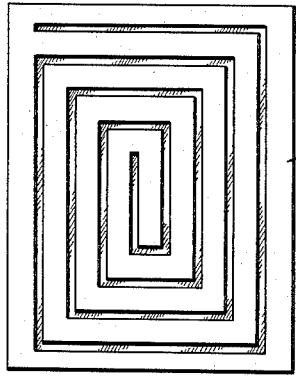
Nikolay W. Adamsky
INVENTOR.

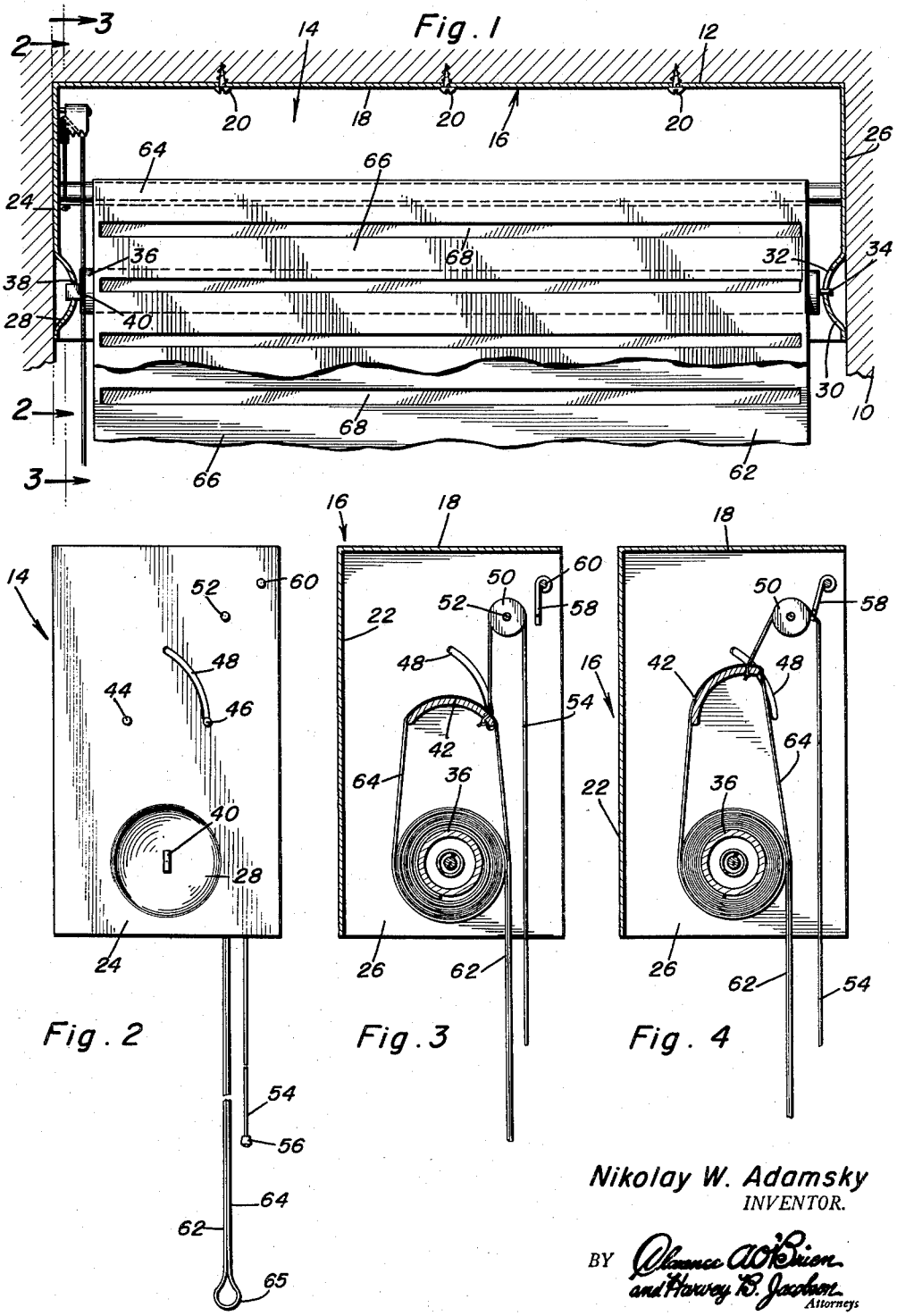

United States Patent Office 2,970,643
Patented Feb. 7, 1961

2,970,643

WINDOW SHADE

Nikolay W. Adamsky, 9 Schenck Ave., Apt. 1H, Great Neck, N.Y., assignor of twenty-five percent to Helen Jane Adamsky and twenty-five percent to Valeria Adamsky, both of New Hyde Park, N.Y.

Filed Oct. 22, 1956, Ser. No. 617,429

4 Claims. (Cl. 160—121)

This invention relates in general to new and useful improvements in shades for windows, and more specifically to an improved window shade wherein by slight shifting of a portion thereof the shade may be made to permit the passage of light or may be impervious to light.

The primary object to this invention is to provide an improved window construction which includes first and second shade elements having transparent areas and impervious areas, the transparent areas being normally aligned to permit the passage of light through the shade elements and there being provided means for shifting one of the shade elements relative to the other to move the transparent areas out of alignment so as to prevent the entry of light through the shade elements.

Another object of this invention is to provide an improved window shade construction which includes a pair of shade elements each having aligned transparent areas, the shade elements being reeled on a single roller and one of the shade elements being passed over an auxiliary support, the auxiliary support being selectively movable so as to move the one shade element out of alignment with the other shade element to prevent of passage of light therethrough.

A further object of this invention is to provide an improved window shade construction which includes a pair of shade elements, the shade elements being primarily impervious to light and having transparent areas, the transparent areas of the two shade elements being aligned to permit the passage of light therethrough, there being provided means for selectively shifting one of the shade elements with respect to the other of the shade elements both in a transverse direction and in a vertical direction whereby the transparent area of the one shade element is moved entirely out of alignment with the other of the shade elements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary sectional view taken through a wall in the vicinity of a window and shows mounted in the window opening a window shade construction which is the subject of this invention, only the upper portion of the window shade being shown;

Figure 2 is an enlarged view taken substantially upon the plane indicated by the section line 2—2 of Figure 1 and shows the shade construction of Figure 1 as viewed from the end thereof, intermediate portions of the shade elements being broken away;

Figure 3 is an enlarged fragmentary vertical sectional view taken substantially upon the plane indicated by the section line 3—3 of Figure 1 and shows the general details and mounting of the shade elements and the means for moving one of the shade elements vertically with respect to the other, the wall construction being omitted;

Figure 4 is an enlarged fragmentary sectional view similar to Figure 3 and shows the one shade element in an elevated position;

Figure 5 is a view similar to Figure 1 and shows a modified form of window shade construction; and Figures 6, 7 and 8 show various patterns of window shade elements, the views being on a small scale.

Referring now to the drawings in detail, it will be seen that there is illustrated in Figure 1 a wall 10 having a window opening 12. Mounted within the window opening 12 is the window shade construction which is the subject of this invention, the window shade construction being referred to in general by the reference numeral 14. The window shade construction 14 includes a mounting frame which is referred to in general by the reference numeral 16.

The mounting frame 16 includes an upper flange 18 which is secured to the upper boundary of the window opening 12 by means of suitable fasteners 20. Formed integral with the forward edge of the upper flange 18 is a depending flange in the form of a valance 22. The mounting frame 16 also includes ends 24 and 26.

The end 24 of the mounting frame 16 includes an inwardly offset button-like portion 28 which is aligned with a similar button-like portion 30 formed in the end 26. The button-like portions 28 and 30 are disposed adjacent the lower edges of the ends 24 and 26 and the button-like portion 30 is provided with a slot 32 for receiving a pin end 34 of a curtain roller 36. The button-like portion 28 is provided with a narrow slot 38 for receiving a flattened end 40 of the roller 36, the roller 36 being a conventional curtain roller.

Extending between the ends 24 and 26 and supported thereby directly above the roller 36 is an arcuate cross-sectional shade element support 42. The support 42 is provided at each end thereof along one edge thereof with mounting pins 44 which extend through the ends 24 and 26. The mounting pins 44 permit the transverse tilting of the support 42. Disposed at the ends of the opposite edge of the support 42 are pins 46 which are guidingly seated in arcuate slots 48 formed in the ends 24 and 26.

Disposed adjacent the inner surface of the end 24 is a small pulley 50. The pulley 50 is mounted on an axle 52 supported by the end 24. Entrained over the pulley 50 is an adjusting line 54 which has one end thereof connected to an end portion of the support 42, as is best illustrated in Figure 1. The opposite end of the adjusting line 54 extends down to a position where it may be easily reached by an occupant of a room of which the window shade construction is a part. The lower end of the adjusting line 54 may be provided with a suitable decorative knob 56. The support 42 has a tendency to retain the position illustrated in Figure 3. However, it may be tilted upwardly, such as the position illustrated in Figure 4, by pulling down on the adjusting line 54. The adjusting line 54 is retained in adjusted position by a keeper 58 which is pivotally mounted on a pin 60 carried by the end 24.

Reeled on the roller 36 are a pair of shade elements 62 and 64. The shade element 62 passes directly downwardly from the roller 36 and is supported thereby. The shade element 64 passes up over the support 42 and down therefrom, the shade element 64 being supported by the support 42. As is best illustrated in Figure 2, the lower ends of the shade elements 62 and 64 are integrally connected together by a loop portion 65. The loop portion 65 permits slight vertical movement of the shade element 64 with respect to the shade element 62 upon the tilting of the support 42 to the position illustrated in Figure 4.

Referring once again to Figure 1 in particular, it will be seen that the shade elements 62 and 64 are of identical construction. Each shade element 62 and 64 is primarily formed of impervious areas 66 which are separated by narrow transparent areas 68. When the shade elements 62 and 64 have their transparent areas 68 aligned, then light is admitted to a room. However, by tilting the support 42, the transparent areas 68 are moved out of registry and as a result no light will be admitted to a room. Thus it will be readily apparent that the window shade construction 14 is of such a nature whereby the shade elements 62 and 64 may be retained in lowered positions, if desired, and light selectively admitted therethrough.

Referring now to Figure 5 in particular, it will be seen that there is mounted in the wall 10 within the window opening 12 a modified form of window shade construction which is referred to in general by the reference numeral 70. The window shade construction 70 includes a mounting frame which is referred to in general by the reference numeral 72. The mounting frame 72 is very similar to the mounting frame 16 and includes an upper flange 74 which is used to mount the mounting frame 72 and is secured to the wall 10 by means of fasteners 76. The mounting frame 72 also includes a depending front valance 78 and ends 80 and 82. The ends 80 and 82 are provided with inwardly projecting boss portions 84 and 86 in which there are received ends of a roller 88.

Disposed above the roller 88 and supported by the ends 80 and 82 in the manner illustrated in Figures 1 through 4, inclusive, is a support 90. The support 90 is selectively tilted by means of an adjusting rope or cord 92 which is entrained over a pulley 94 carried by the end 80. The adjusting rope 92 is provided with a latch member 96 also carried by the end 80.

Reeled on the roller 88 and passing over the support 90 is a shade element 98. The shade element 98 is formed primarily of impervious areas 100 with the impervious areas being separated by vertically extending transparent areas 102.

The ends 80 and 82 extend down below the boss portions 84 and 86 a considerable distance and the end 80 is provided with an enlarged boss portion 104 which extends inwardly of the mounting frame 72 a considerable distance. A similar boss portion 106 projects inwardly from the end 82. The boss portions 104 and 106 are provided with slots 108 in the ends thereof, the slots 108 receiving elongated ends 110 of a roller 112.

In order that the roller 112 may be selectively transversely shifted with respect to the mounting frame 72, there is mounted within the boss portion 104 a small pulley 114. Entrained over the pulley 114 is a pull rope 116 which has its opposite end connected to one of the ends 110 of the roller 112. A similar pulley 118 is mounted within the boss portion 106 and has entrained thereover a pull rope 120 which is attached to the opposite end 110 of the roller 112. By selectively pulling on the pull ropes 116 and 120, it will be readily apparent that the roller 112 may be shifted transversely of the mounting frame 72.

Reeled on the roller 112 is a second shade element 122. The shade element 122 is of the same design as the shade element 98 and includes relatively large impervious areas 124 which are separated by transparent areas 126, the transparent areas 126 extending vertically.

If it is desired that light should enter into a room, then the shade elements 98 and 122 are disposed in registry. This permits light to pass through the aligned transparent areas 102 and 126. On the other hand, if it is not desired to admit light into a room, it is merely necessary to pull on the pull rope 120 which will then shift the shade element 122 to the right, as viewed in Figure 5, to move the transparent areas 126 out of registry with the transparent areas 102.

The details of the shade element 122 are illustrated in Figure 8. It will be seen that the pattern is a simple one with the transparent areas 126 extending vertically thereof substantially the full length and that all of the remainder of the shade element 122 is in the form of the impervious areas 124. Illustrated in Figures 6 and 7 are other shade elements 128 and 130 which are of different designs. The shade elements 128 and 130 may be used in the window shade construction 70. It is to be understood that when the shade elements 128 and 130 are used, they will be mounted in identical pairs on the rollers 88 and 112. It is to be understood that the designs of the shade elements 128 and 130 are merely basic designs and that the designs may vary as desired in lieu of vertical and horizontal straight lines. For example, the designs may be in the form of ships, religous scenes, etc.

When using the shade elements 128 and 130, or other shade elements of varying designs including horizontal and vertical components, the amount of light entering into a room may be varied in two ways. It is to be noted that the shade elements 128 and 130 include transparent areas which extend both horizontally and vertically. Thus by shifting one of the shade elements 128 or 130 transversely with respect to its mate, then the vertical transparent areas may be moved out of registry while the horizontal transparent areas may remain in registry. On the other hand, if the support 90 is pivoted, then the horizontal transparent areas will be moved out of registry. By both shifting the roller 112 and pivoting the support 90, all of the transparent areas of the shade elements 128 and 130 may be moved out of registry.

Although the invention has been illustrated as including only transparent and impervious areas, it is to be understood that the invention is not intended to be so limited. In order that various tones of light may be permitted, the impervious areas may be of a solid color and the area between the impervious area and the transparent areas may be progressively lighter shades of that color. Thus by selectively aligning the transparent areas with a desired shade of the colored impervious areas, the tone of light entering into a room may be varied. Also, by varying the colors varying effects may be obtained.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A shade construction comprising two shade rollers, means supporting said shade rollers for independent rotation about spaced and substantially parallel axes, means carried by said supporting means for relatively, slidably and horizontally adjusting one of said rollers, said rollers having attached to each one end of a flexible sheet, said support means disposed at the extremities of said rollers and journaling the ends thereof, means independent of roller rotation for adjusting vertical relationship of said shades while maintaining the shades in fixed lateral position relative to each other, the extended portions of said sheets adjacent at least one of said rollers being disposed in vertically extending sliding contacting relation relative to each other, said vertical adjusting means including an elongated support element mounted above said rollers and over which one shade passes, and means for adjustably mounting at least a portion of said support element for movement to increase and decrease its elevation above said rollers.

2. The combination of claim 1 wherein at least one of said shade sheets has in the direction of its travel series of generally parallel strips with each adjacent strip having different light transmitting characteristics.

3. The combination of claim 1 wherein each of said shade sheets has in the direction of travel of one of said shade sheets a series of generally parallel strips with each adjacent strip having different light transmitting characteristics.

4. A shade construction comprising two shade rollers, means supporting said shade rollers for independent rotation about spaced and substantially parallel axes, said support means disposed at the extremities of said rollers and engaging the ends thereof, said rollers having attached to each one end of a flexible sheet, means independent of roller rotation for adjusting vertical relationship of said shades while maintaining the shades in fixed lateral position relative to each other, the extended portions of said shade sheets adjacent at least one of said rollers being disposed in vertically extending sliding contacting relation relative to each other, said adjusting means including an elongated support element mounted above said rollers and over which one shade sheet passes, and means for adjustably mounting at least a portion of said support element for movement to increase and decrease its elevation above said rollers.

References Cited in the file of this patent

UNITED STATES PATENTS

| | | |
|---|---|---|
| 2,029,675 | Schlamp | Feb. 4, 1936 |
| 2,142,822 | Moore | Jan. 3, 1939 |
| 2,281,022 | Cavanaugh | Apr. 28, 1942 |
| 2,328,257 | Butts | Aug. 31, 1943 |
| 2,336,692 | Lubetsky | Dec. 14, 1943 |
| 2,384,377 | Holstein | Sept. 4, 1945 |
| 2,702,081 | North et al. | Feb. 15, 1955 |

FOREIGN PATENTS

| | | |
|---|---|---|
| 575,088 | Great Britain | Feb. 1, 1946 |